(12) United States Patent
Li et al.

(10) Patent No.: US 8,739,627 B2
(45) Date of Patent: Jun. 3, 2014

(54) INERTIAL SENSOR WITH OFF-AXIS SPRING SYSTEM

(75) Inventors: Gary G. Li, Chandler, AZ (US); Yizhen Lin, Gilbert, AZ (US); Andrew C. McNeil, Chandler, AZ (US); Lisa Z. Zhang, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 296 days.

(21) Appl. No.: 13/282,192

(22) Filed: Oct. 26, 2011

(65) Prior Publication Data

US 2013/0104651 A1    May 2, 2013

(51) Int. Cl.
*G01C 19/56* (2012.01)

(52) U.S. Cl.
USPC .................. 73/504.12; 73/504.04; 73/504.14

(58) Field of Classification Search
USPC ................ 73/504.12, 504.14, 504.04, 504.02
See application file for complete search history.

(56) References Cited

U.S. PATENT DOCUMENTS

| | | | |
|---|---|---|---|
| 6,892,575 B2 | 5/2005 | Nasiri et al. | |
| 6,915,693 B2 | 7/2005 | Kim et al. | |
| 6,921,952 B2 | 7/2005 | Jeong | |
| 7,434,464 B2 * | 10/2008 | Li | 73/504.04 |
| 8,042,396 B2 * | 10/2011 | Coronato et al. | 73/504.12 |
| 8,312,769 B2 * | 11/2012 | Coronato et al. | 73/504.04 |
| 2004/0149035 A1 * | 8/2004 | Acar et al. | 73/504.12 |
| 2009/0064780 A1 | 3/2009 | Coronato et al. | |
| 2010/0192690 A1 * | 8/2010 | Classen et al. | 73/504.12 |
| 2010/0236327 A1 | 9/2010 | Mao | |

OTHER PUBLICATIONS

Tsai et al., Design and Simulation of a Dual-Axis Sensing Decoupled Vibratory Wheel Gyroscope, Sensors and Acutators A: Physical, vol. 126, Issue 1, Jan. 26, 2006, pp. 33-40, www.sciencedirect.com.

* cited by examiner

*Primary Examiner* — Helen Kwok
(74) *Attorney, Agent, or Firm* — Schmeiser, Olsen & Watts LLP; Lowell W. Gresham; Charlene R. Jacobsen (57) ABSTRACT

An inertial sensor (20) includes a drive mass (30) configured to undergo oscillatory motion and a sense mass (32) linked to the drive mass (30). On-axis torsion springs (58) are coupled to the sense mass (32), the on-axis torsion springs (58) being co-located with an axis of rotation (22). The inertial sensor (20) further includes an off-axis spring system (60). The off-axis spring system (60) includes off-axis springs (68, 70, 72, 74), each having a connection interface (76) coupled to the sense mass (32) at a location on the sense mass (32) that is displaced away from the axis of rotation (22). Together, the on-axis torsion springs (58) and the off-axis spring system (60) enable the sense mass (32) to oscillate out of plane about the axis of rotation (22) at a sense frequency that substantially matches a drive frequency of the drive mass (30).

18 Claims, 4 Drawing Sheets

INERTIAL SENSOR WITH OFF-AXIS SPRING SYSTEM

TECHNICAL FIELD OF THE INVENTION

The present invention relates generally to microelectromechanical systems (MEMS) devices. More specifically, the present invention relates to a MEMS inertial sensor with improved matching between the drive and sense frequencies.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. Microelectromechanical Systems (MEMS) sensor devices are widely used in applications such as automotive, inertial guidance systems, household appliances, game devices, protection systems for a variety of devices, and many other industrial, scientific, and engineering systems.

MEMS angular inertial sensors may be implemented that sense angular velocity or angular acceleration around one or more axes. A MEMS gyro sensor, alternatively referred to as a "gyroscope," "angular rate sensor", "gyrometer," "gyroscope sensor," or "yaw rate sensor," is an inertial sensor that senses angular speed or velocity around one or more axes. One such sensor, referred to as an "x-axis" gyro, is configured to sense angular rotation about an axis parallel to the gyro substrate due to the influence of a Coriolis acceleration component. An angular accelerometer is an accelerometer that measures the rate of change of angular velocity.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments discloses herein entail microelectromechanical systems (MEMS) inertial sensor devices in the form of, for example, gyro sensors and angular accelerometer sensors having one or more teeter-totter type sense masses. In an illustrative embodiment, a gyro sensor may be configured to sense angular rotation rate about an axis parallel to the substrate of the gyro sensor due to the influence of a Coriolis acceleration component. The gyro sensor includes both on-axis torsion springs and an off-axis spring system coupled to a teeter-totter sense mass. The on-axis torsion springs are placed along the axis of rotation and the off-axis spring system is coupled to the sense mass at one or more locations that are displaced from the axis of rotation. The off-axis spring system provides sufficient torsion stiffness in the axis of rotation to achieve improved matching between a drive frequency and a sense frequency of the gyro sensor.

Figure 1:
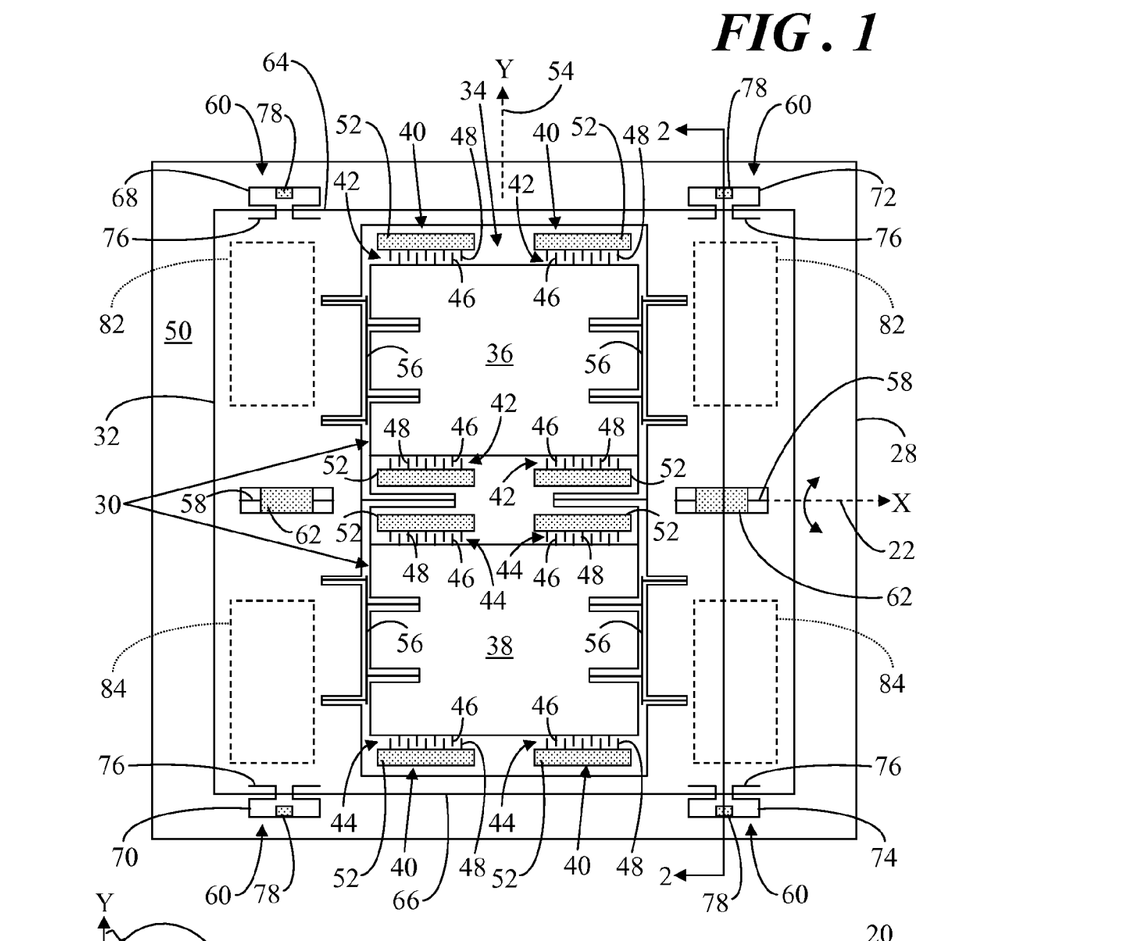
FIG. 1 shows a top view of a gyro sensor in accordance with an embodiment.
Figure 2:
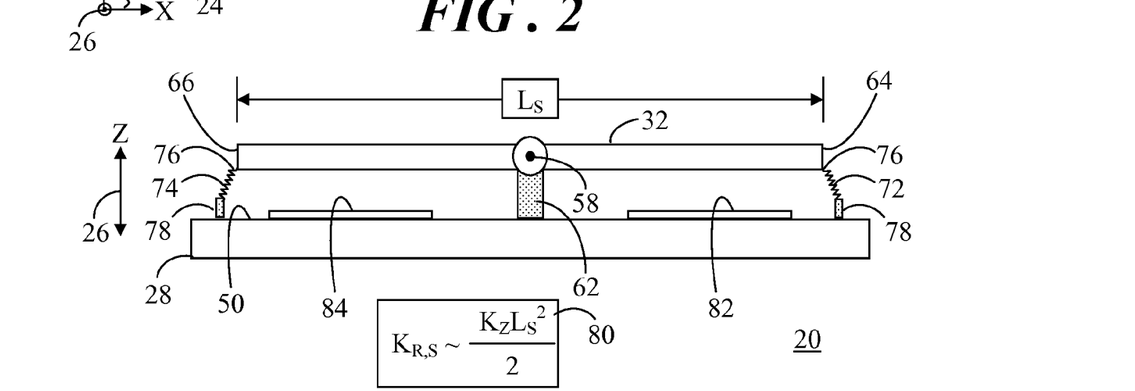
FIG. 2 shows a side conceptual view of the gyro sensor of FIG. 1.

Referring to FIGS. 1 and 2, FIG. 1 shows a top view of an inertial sensor 20 in accordance with an embodiment, and FIG. 2 shows a side conceptual view of inertial sensor 20. Inertial sensor 20 is generally configured to sense angular rate about an axis of rotation 22, i.e., the X-axis in a three-dimensional coordinate system. Accordingly, inertial sensor 20 is referred to herein as a gyro sensor 20. By convention, gyro sensor 20 is illustrated as having a generally planar structure within an X-Y plane 24, wherein a Z-axis 26 extends out of the page, normal to X-Y plane 24 in FIG. 1 and Z-axis 26 extends upwardly and downwardly as shown in FIG. 2.

Gyro sensor 20 includes a substrate 28, a drive mass 30, a sense mass 32, and various mechanical linkages which will be described in detail below. In the specific embodiment of FIGS. 1 and 2, drive mass 30 resides in a central opening 34 extending through sense mass 32. Drive mass 30 includes a drive mass structure 36 and another drive mass structure 38 disposed laterally in X-Y plane 24 to drive structure 36. Drive mass structures 36 and 38 are situated symmetrically relative to one another about axis of rotation 22.

A drive system 40 resides in central opening 34 and operably communicates with each of drive mass structures 36 and 38. More specifically, drive system 40 includes a set of drive elements 42 configured to oscillate drive structure 36 and another set of drive elements 44 configured to oscillate drive structure 38. Each set of drive elements 42 and 44 includes pairs of electrodes, referred to as comb fingers 46 and 48. In an embodiment, comb fingers 46 are coupled to and extend from a perimeter of each of drive mass structures 36 and 38. Comb fingers 48 are fixed to a surface 50 of substrate 28 via anchors 52. Comb fingers 48 are spaced apart from and positioned in alternating arrangement with comb fingers 46. By virtue of their attachment to drive mass structures 36 and 38, comb fingers 46 are movable together with drive mass structures 36 and 38. Conversely, due to their fixed attachment to substrate 28, comb fingers 48 are stationary relative to comb fingers 46. Accordingly, comb fingers 46 are referred to herein as movable comb fingers 46, and comb fingers 48 are referred to herein as fixed comb fingers 48. Only a few movable and fixed comb fingers 46 and 48 are shown for clarity of illustration. Those skilled in the art should readily recognize that the quantity and structure of the comb fingers will vary in accordance with design requirements.

An entire length of fixed comb fingers 48 may be attached to surface 50 of substrate 28 in some embodiments. In alternative embodiments, each of fixed comb fingers 48 may be anchored to surface 50 of substrate 28 at a single location as represented by anchors 52 with the remaining portion of each of fixed comb fingers 48 being suspended above surface 28. This second approach can be desirable in some embodiments to achieve greater efficiencies in usage area and to reduce susceptibility to package stress.

For consistency throughout the description of the following figures, any anchoring structures, such as anchors 52, that connect an element of gyro sensor 20 to the underlying surface 50 of substrate 28 is illustrated with a stippled pattern. Conversely, any elements that are not anchoring structures do not include this stippled pattern and are therefore suspended above surface 50 of substrate 28.

Drive mass structures 36 and 38 are configured to undergo oscillatory motion within X-Y plane 24. In general, an alternating current (AC) voltage may be applied to fixed comb fingers 48 via a drive circuit (not shown) to cause drive mass structures 36 and 38 to linearly oscillate along a Y-axis 54. In an embodiment, the AC voltage is suitably applied to fixed comb fingers 48 to cause movable comb fingers 46 (and thus drive mass structures 36 and 38) to move generally parallel to fixed comb fingers 48. Drive mass structures 36 and 38 may be suitably linked together or otherwise suitably driven to move in opposite directions, i.e., antiphase, along Y-axis 54.

Link spring components 56 couple each of drive mass structures 36 and 38, respectively, to sense mass 32. As such, drive mass structures 36 and 38 are suspended above surface 50 of substrate 28 and do not have a direct physical attachment to substrate 28. Link spring components 56 may be any convenient shape, size, and material that allow a large oscillatory linear motion of drive mass structures 36 and 38 in plane 24 along Y-axis 54 yet are rigid enough to transfer the Coriolis force from drive mass structures 36 and 38 to sense mass 32 along Z-axis 26.

Gyro sensor 20 further includes on-axis torsion springs 58 and an off-axis spring system 60. On-axis torsion springs 58 are coupled to sense mass 32 and are co-located with X-axis of rotation 22. In the illustrated embodiment, each of on-axis torsion springs 58 connects sense mass 32 to surface 50 of substrate 28 via anchors 62 which are also co-located with X-axis of rotation 22.

Sense mass 32 includes outer ends 64 and 66 symmetrically located on opposing sides of X-axis of rotation 22. That is, the frame structure of sense mass 32 is centered at X-axis of rotation 22 so that outer ends 64 and 66 are equidistant from X-axis of rotation 22. In the illustrated embodiment, off-axis spring system 60 includes off-axis springs 68, 70, 72, and 74. Off-axis springs 68 and 72 are disposed at outer end 64 of sense mass 32, and off-axis springs 70 and 74 are disposed at outer end 66 of sense mass 32. In particular, each of off-axis springs 68, 70, 72, and 74 has a connection interface 76 that is directly physically coupled to sense mass 32 at locations that are displaced away from X-axis of rotation 22. In the illustrated embodiment, each of springs 68, 70, 72, 74 connects sense mass 32 to surface 50 of substrate 28 via anchors 78. Thus, springs 68, 70, 72, and 74 are generally linear springs, each of which has connection interface 76 coupled to sense mass 32 and an opposing end coupled to one of anchors 78, that restrict the out-of-plane movement of sense mass 32 so that it rotates about X-axis of rotation 22.

In general, the rotational stiffness, $K_{R,S}$, incurred through the implementation of springs 68, 70, 72, and 74 is a function of the Z-axis spring constant, $K_Z$ (i.e., the spring constant of each of linear springs 68, 70, 72, and 74), and the distance, $L_s$, between springs 68, 72 at end 64 and springs 70, 74 at end 66 of sense mass 32. Rotational stiffness, $K_{R,S}$, is represented in FIG. 2 by an equation 80. The effective pivot point for springs 68, 70, 72, and 74 is midway if the springs have the same spring constant, $K_Z$. That is, the symmetrical placement of springs 68, 70, 72, and 74 results in the effective pivot point of sense mass 32 coinciding with X-axis of rotation 22 and on-axis torsion springs 58. The shape, size, quantity, locations, material, and spring constants of on-axis torsion springs 58 and springs 68, 70, 72, and 74 of off-axis spring system 60 can be suitably selected in accordance with known mechanical design principles to achieve the desired stiffness for frequency matching, stability, and sensing range.

Substrate 28 can include a semiconductor layer (not shown) that is covered by one or more insulation layers (not shown). The semiconductor layer is typically a silicon wafer upon which electronics associated with gyro sensor 20 may, in some cases, also be fabricated using conventional manufacturing technologies. The insulating layer may include glass, silicon dioxide, silicon nitride, or any other compatible material. A variety of conductive plates, or electrodes, are formed on surface 50 of substrate 28 in conjunction with the other fixed components of gyro sensor 20.

In the simplified embodiment, the electrodes include X-sensing electrodes 82 and 84. Conductors (not shown) can be formed on substrate 28 to provide separate electrical connections to electrodes 82 and 84 and to sense mass 32. Electrodes 82 and 84 are formed from a conductive material such as polysilicon, and can be formed at the same time as the respective conductors if the same materials are chosen for such components. Electrodes 82 and 84 are visible in FIG. 2, but are obscured in FIG. 1 by the overlying sense mass 32. Accordingly, in FIG. 1, electrodes 82 and 84 are represented in dashed line form to illustrate their physical placement relative to sense mass 32. Although only X-sensing electrodes 82 and 84 are shown, those skilled in the art will recognize that in alternative embodiments, additional electrode types may be provided for frequency tuning, force feedback, and/or quadrature compensation.

In operation, drive mass structures 36 and 38 of drive mass 30 undergo oscillatory linear motion within X-Y plane 24 in antiphase. In the illustrated embodiment, wherein the axis of rotation is designated as X-axis 22, drive mass structures 36 and 38 linearly oscillate in opposite directions substantially parallel to Y-axis 54 (i.e., up and down in FIG. 1). As a result of a Coriolis acceleration component, on-axis torsion springs 58 and springs 68, 70, 72, 74 that make up off-axis spring system 60 enable sense mass 32 to oscillate out of X-Y plane 24, along Z-axis 26 as a function of angular rate, i.e., the angular velocity, of gyro sensor 20 about X-axis of rotation 22.

Link spring components 56 couple sense mass 32 to drive mass 30 such that sense mass 32 is substantially decoupled from drive mass 30 with respect to the oscillatory linear motion of drive mass 30, but is coupled to drive mass 30 with respect to the oscillatory motion out of X-Y plane 24 of sense mass 32. In other words, the linkage established via link spring components 56 is configured such that sense mass 32 is relatively unaffected by the linear movement of drive mass 30 along Y-axis 54. However, sense mass 32 is linked to drive mass 30 so that both sense mass 32 and drive mass 30 jointly undergo out-of-plane motion due to the Coriolis forces during rotation of gyro sensor 20 about X-axis of rotation 22. As sense mass 32 undergoes the oscillatory out-of-plane motion, the position change is sensed as changes in capacitance by electrodes 82 and 84. This change in capacitance is sensed at electrodes 82 and 84 and is processed electronically in the conventional manner to obtain the angular rate of gyro sensor 20 about X-axis of rotation 22.

It is the coupling between the drive motion of drive mass 30 along Y-axis 54 and the angular rate of gyro sensor about X-axis of rotation 22 that produces the Coriolis force which, in turn, displaces sense mass 32 out of plane 24 along Z-axis 26. The Coriolis force is very small in magnitude. In accordance with an embodiment, the resonance of gyro sensor 20 is advantageously exploited order to boost the output signal (i.e., the capacitances sensed at electrodes 82 and 84). That is, the frequency of oscillation of sense mass 32 is sufficiently close to the frequency of oscillation of drive mass 30 for optimal energy transfer from drive mass 30 to sense mass 32.

In some prior art inertial sensors, on-axis torsion springs are designed to be relatively flexible, or soft, so as to enable rotation of the sense mass at low frequencies (e.g., at frequencies less than approximately ten kilohertz). Unfortunately, the softness of such on-axis torsion springs can result in a frequency mismatch between the drive mass and the sense mass.

That is, the output frequency (i.e., the frequency of oscillation of the sense mass) may not adequately track, or equal, the input frequency (i.e., the frequency of oscillation of the drive mass). In order to achieve sufficient torsion stiffness, torsion springs have been designed to be short and wide in other prior gyro sensor designs. However, as processes vary from wafer to wafer in MEMS gyro sensor fabrication, such short and wide torsion springs may not track adequately with the drive springs (i.e., the linking members between the drive mass and the sense mass) because the drive springs can undergo bending motion. Accordingly, the frequency of oscillation of the sense mass may differ significantly from the frequency of oscillation of the drive mass in prior art designs, thereby resulting in suboptimal energy transfer from the drive mass to the sense mass.

On-axis torsion springs 58 and off-axis spring system 60 enable sense mass 32 to oscillate out of plane 24 as a function of angular rate of gyro sensor 20. Moreover, on-axis torsion springs 58 and off-axis spring system 60 function cooperatively to effectively reduce spring constant variation due to variations in gyro sensor fabrication processes. That is, on-axis torsion springs 58 and springs 68, 70, 72, and 74 of off-axis spring system 60 are configured such that their total spring constant is substantially equivalent to the total spring constant of link spring components 56. This results in a design that achieves a closer match between the frequency of oscillation of drive mass 30 (i.e., the drive frequency) and the frequency of oscillation of sense mass 32 (i.e., the sense frequency). Accordingly, sense mass 32 oscillates at a sense frequency that is substantially equivalent to the drive frequency across a wide range of drive frequencies, primarily due to process variation, so as to boost the output signal, i.e., the capacitances sensed at electrodes 82 and 84.

Figure 3:
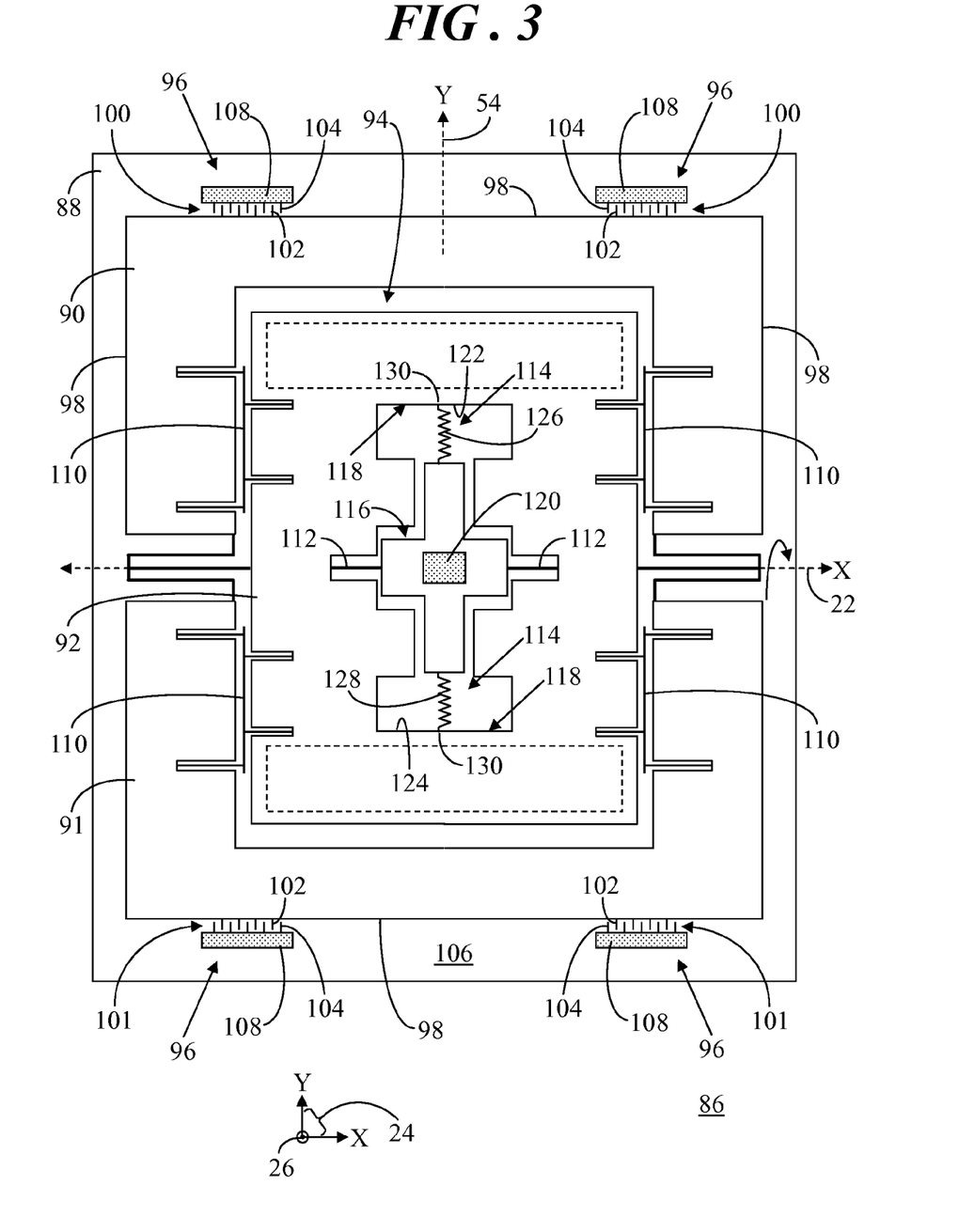
FIG. 3 shows a top view of a gyro sensor in accordance with an alternative embodiment.

FIG. 3 shows a top view of a gyro sensor 86 in accordance with an alternative embodiment. Like gyro sensor 20, gyro sensor 86 is generally configured to sense angular rate about X-axis of rotation 22. Thus, gyro sensor 86 has a generally planar structure within X-Y plane 24. Gyro sensor 86 includes a substrate 88, drive mass structures 90 and 91, a sense mass 92, and various mechanical linkages which will be described in detail below. In the specific embodiment of FIG. 3, sense mass 92 resides in a central opening 94 extending through drive mass structures 90 and 91.

Gyro sensor 86 further includes a drive system 96 in communication with drive mass structures 90 and 91. In this embodiment, drive system 96 is located outside of an outer perimeter 98 of drive mass structures 90 and 91. Drive system 96 includes a set of drive elements 100 configured to oscillate drive mass structure 90 and another set of drive elements 101 configured to oscillate drive mass structure 91. Each set of drive elements 100 and 101 includes movable comb fingers 102 coupled to and extending from outer perimeter 98 of each of drive mass structures 90 and 91, and fixed comb fingers 104 fixed to a surface 106 of substrate 88 by anchors 108.

Drive mass structures 90 and 91 may be suitably linked together or otherwise suitably driven to move in opposite directions, i.e., antiphase, along Y-axis 54. Link spring components 110 couple drive mass structures 90 and 91 to sense mass 92. As such, drive mass structures 90 and 91 are suspended above surface 106 of substrate 88 and do not have a direct physical attachment to substrate 88. Link spring components 110 may be any convenient shape, size, and material that allow a large oscillatory linear motion of drive mass structures 90 and 91 in X-Y plane 24 along Y-axis 54 yet are rigid enough to transfer the Coriolis force from drive mass 90 to sense mass 92 along Z-axis 26 (FIG. 2).

Gyro sensor 86 further includes on-axis torsion springs 112 and an off-axis spring system 114. On-axis torsion springs 112 are coupled to sense mass 92 and are co-located with X-axis of rotation 22. In the illustrated embodiment, sense mass 92 includes a central opening 116 delineated by an inner periphery 118 of sense mass 92. An anchor structure 120 resides in central opening 116 of sense mass 92. In an embodiment, anchor structure 120 is co-located with X-axis of rotation 22. On-axis torsion springs 112 connect sense mass 92 to surface 106 of substrate 88 via this centrally located anchor structure 120.

Inner periphery 118 of sense mass 92 includes inner ends 122 and 124 symmetrically located on opposing sides of X-axis of rotation 22. That is, the frame structure of sense mass 92 is centered at X-axis of rotation 22 so that inner ends 122 and 124 are spaced equidistant from X-axis of rotation 22. Off-axis spring system 114 includes off-axis springs 126 and 128 residing in central opening 116. Off-axis spring 126 is disposed at inner end 122 of sense mass 92, and off-axis spring 128 is disposed at inner end 124 of sense mass 92. In particular, each of off-axis springs 126 and 128 has a connection interface 130 that is directly physically coupled to sense mass 92 at locations that are displaced away from X-axis of rotation 22. Each of off-axis springs 126 and 128 couples to anchor structure 120 so as to connect sense mass 92 to surface 106 of substrate via the centrally located anchor structure 120. The shape, size, quantity, locations, material, and spring constants of on-axis torsion springs 112 and springs 126 and 128 of off-axis spring system 114 can be suitably selected in accordance with known mechanical design principles to achieve the desired stiffness for frequency matching, stability, and sensing range. In particular, on-axis torsion springs 112 and springs 126 and 128 of off-axis spring system 114 are suitably configured so that their total spring constant is substantially equivalent to the total spring constant of link spring components 110.

In operation, drive mass structures 90 and 91 undergo oscillatory linear motion within X-Y plane 24 in antiphase. In the illustrated embodiment, wherein the axis of rotation is designated as X-axis 22, drive mass structures 90 and 91 linearly oscillate in opposite directions substantially parallel to Y-axis 54 (i.e., up and down in FIG. 3). As a result of a Coriolis acceleration component, on-axis torsion springs 112 and off-axis springs 126 and 128 that make up off-axis spring system 114 enable sense mass 92 and proof mass structures 90 and 91 to oscillate out of X-Y plane 24 (i.e., about X-axis of rotation 22), along Z-axis 26 as a function of angular rate, i.e., the angular velocity, of gyro sensor 86 about X-axis of rotation 22. As sense mass 92 undergoes the oscillatory out-of-plane motion, the position change is sensed as changes in capacitance by electrodes (shown in dashed line form) underlying sense mass 92. This change in capacitance is subsequently processed electronically in the conventional manner to obtain the angular rate of gyro sensor 86 about X-axis of rotation 22.

Like gyro sensor 20 (FIG. 1), on-axis torsion spring 112 and off-axis spring system 114 of gyro sensor 86 function cooperatively to effectively reduce spring constant variation due to variations in gyro sensor fabrication processes. This results in another design that achieves a closer match between the frequency of oscillation of drive mass 90 (i.e., the drive frequency) and the frequency of oscillation of sense mass 92 (i.e., the sense frequency).

The examples provided above are embodiments of a single-axis gyro inertial sensor. However, the concept of both on-axis torsion springs and an off-axis spring system may additionally be adapted in a dual-axis gyro inertial sensor design, where two examples are provided below for illustrative purposes.

Figure 4:
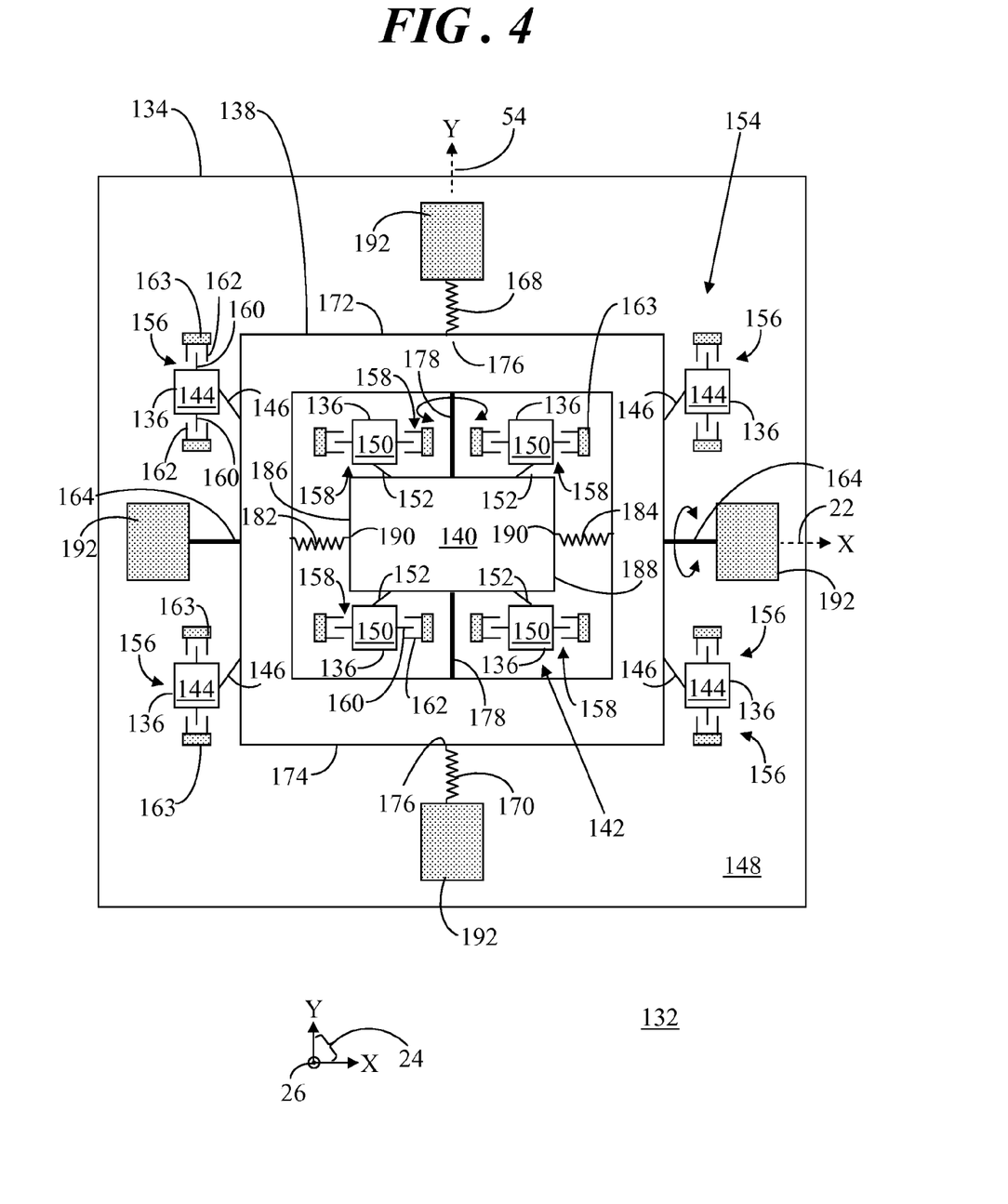
FIG. 4 shows a top view of a dual-axis gyro sensor in accordance with an alternative embodiment.

FIG. 4 shows a top view of a dual-axis gyro sensor 132 in accordance with an alternative embodiment. Gyro sensor 132 has a generally planar structure within X-Y plane 24, and is generally configured to sense angular rate about both X-axis of rotation 22 and Y-axis of rotation 54. Gyro sensor 132 includes a substrate 134, a drive mass 136, a sense mass 138, another sense mass 140, and various mechanical linkages which will be described in detail below. In the specific embodiment of FIG. 4, sense mass 140 resides in a central opening 142 extending through sense mass 138.

Drive mass 136 includes multiple drive mass structures 144 suitably arranged about sense mass 138, and connected to sense mass 138 via link spring components 146. Thus, drive mass structures 144 are suspended above a surface 148 of substrate 134 and do not have a direct physical attachment to substrate 134. Drive mass 136 further includes multiple drive mass structures 150 suitably arranged about sense mass 140, and connected to sense mass 140 via additional link spring components 152. Thus, drive mass structures 150 are also suspended above surface 148 of substrate 134 and do not have a direct physical attachment to substrate 134. Drive mass structures 144 are situated symmetrically relative to one another about X-axis of rotation 22. Likewise, drive mass structures 150 are situated symmetrically relative to one another about Y-axis of rotation 54.

A drive system 154 resides proximate drive mass structures 144 and 150. Drive system 154 includes sets of drive elements 156 in proximity to drive mass structures 144 and configured to oscillate drive mass structures 144. Drive system 154 further includes additional sets of drive elements 158 in proximity to drive mass structures 152 and configured to oscillate drive mass structures 150. Each set of drive elements 156 and 158 includes movable comb fingers 160 and fixed comb fingers 162. In an embodiment, movable comb fingers 160 are coupled to and extend from a perimeter of each of drive mass structures 144 and 150, and fixed comb fingers 162 are coupled to surface 148 of substrate 134 via anchors 163. Fixed comb fingers 162 are spaced apart from and positioned in alternating arrangement with movable comb fingers 160.

Drive mass structures 144 and 150 are configured to undergo oscillatory motion within X-Y plane 24. In general, an alternating current (AC) voltage may be applied to fixed comb fingers 162 of set of drive elements 156 via a drive circuit (not shown) to cause drive mass structures 144 to linearly oscillate substantially parallel to Y-axis 54. By a similar principle, an AC voltage may be applied to fixed comb fingers 162 of set of drive elements 158 via a drive circuit to cause drive mass structures 150 to linearly oscillate substantially parallel to X-axis 22.

Dual-axis gyro sensor 132 further includes on-axis torsion springs 164 coupled to sense mass 138 and co-located with X-axis of rotation 22, and an off-axis spring system. In the illustrated embodiment, the off-axis spring system includes off-axis springs 168 and 170. Off-axis spring 168 is disposed at an outer end 172 of sense mass 138 and off-axis spring 170 is disposed at an outer end 174 of sense mass 138, where outer ends 172 and 174 are symmetrically located on opposing sides of X-axis of rotation 22. In particular, each of off-axis springs 168 and 170 has a connection interface 176 that is directly physically coupled to sense mass 138 at locations that are displaced away from X-axis of rotation 22. On-axis torsion springs 164 and off-axis springs 168 and 170 enable sense mass 138 to oscillate out of X-Y plane 24, along Z-axis 26 as a function of the angular rate, i.e., the angular velocity, of gyro sensor 132 about X-axis of rotation 22.

Additionally, dual-axis gyro sensor 132 includes on-axis torsion springs 178 coupled to sense mass 140 and co-located with Y-axis of rotation 54, and an off-axis spring system. In the illustrated embodiment, the off-axis spring system includes off-axis springs 182 and 184. Off-axis spring 182 is disposed at an outer end 186 of sense mass 140 and off-axis spring 184 is disposed at an outer end 188 of sense mass 140, where outer ends 186 and 188 are symmetrically located on opposing sides of Y-axis of rotation 54. In particular, each of off-axis springs 182 and 184 has a connection interface 190 that is directly physically coupled to sense mass 140 at locations that are displaced away from Y-axis of rotation 54. On-axis torsion springs 178 and off-axis springs 182 and 184 of the off-axis spring system enable sense mass 140 to oscillate out of X-Y plane 24, along Z-axis 26 as a function of the angular rate, i.e., the angular velocity, of gyro sensor 132 about Y-axis of rotation 54.

In the illustrated embodiment, each of on-axis torsion springs 164 and off-axis torsion springs 168 and 170 connect sense mass 138 to surface 148 of substrate 134 via anchors 192. In addition, each of on-axis torsion springs 178 and off-axis torsion springs 182 and 184 connect the inner sense mass 140 to sense mass 138. Accordingly, each of sense masses 138 and 140 is suspended above the underlying substrate 134. Electrodes (not shown) are formed on surface 148 of substrate 134 at suitable locations underlying sense masses 138 and 140 to sense the position change as each of sense masses 138 and 140 undergo oscillatory out-of-plane motion.

In operation, drive mass structures 144 and 150 of drive mass 136 undergo oscillatory linear motion within X-Y plane 24. In the illustrated embodiment, drive mass structures 144 linearly oscillate substantially parallel to Y-axis 54 (i.e., up and down in FIG. 4). Drive mass structures 144 on opposing sides of X-axis of rotation 22 may be driven to linearly oscillate in opposite directions (antiphase) as discussed above. In addition, drive mass structures 150 linearly oscillate substantially parallel to X-axis 22 (i.e. right and left in FIG. 4). Like drive mass structures 144, drive mass structure 150 on opposing sides of X-axis of rotation 54 may be driven to linearly oscillate in opposite directions (antiphase).

As a result of the Coriolis acceleration component, on-axis torsion springs 164 and off-axis springs 168 and 170 enable sense mass 138 to oscillate out of X-Y plane 24, along Z-axis 26 (FIG. 1) as a function of angular rate, i.e., the angular velocity, of gyro sensor 132 about X-axis of rotation 22. By the same principle, on-axis torsion springs 178 and off-axis springs 182 and 184 enable sense mass 140 to oscillate out of X-Y plane 24, along Z-axis 26 as a function of angular rate, i.e., the angular velocity, of gyro sensor 132 about Y-axis of rotation 54.

As discussed above in connection with gyro sensor 20, on-axis torsion springs 164 and off-axis springs 168 and 170 of gyro sensor 132 function cooperatively to effectively reduce spring constant variation due to variations in gyro sensor fabrication processes. This results in a design that achieves a closer match between the frequency of oscillation of drive mass structures 144 (i.e., the drive frequency) and the frequency of oscillation of sense mass 138 (i.e., the sense frequency). Likewise, on-axis torsion springs 178 and off-axis springs 182 and 184 function cooperatively to effectively reduce spring constant variation due to variations in gyro sensor fabrication processes. This results in a design that achieves a closer match between the frequency of oscillation of drive mass structures 150 (i.e., the drive frequency) and the frequency of oscillation of sense mass 140 (i.e., the sense frequency).

Figure 5:
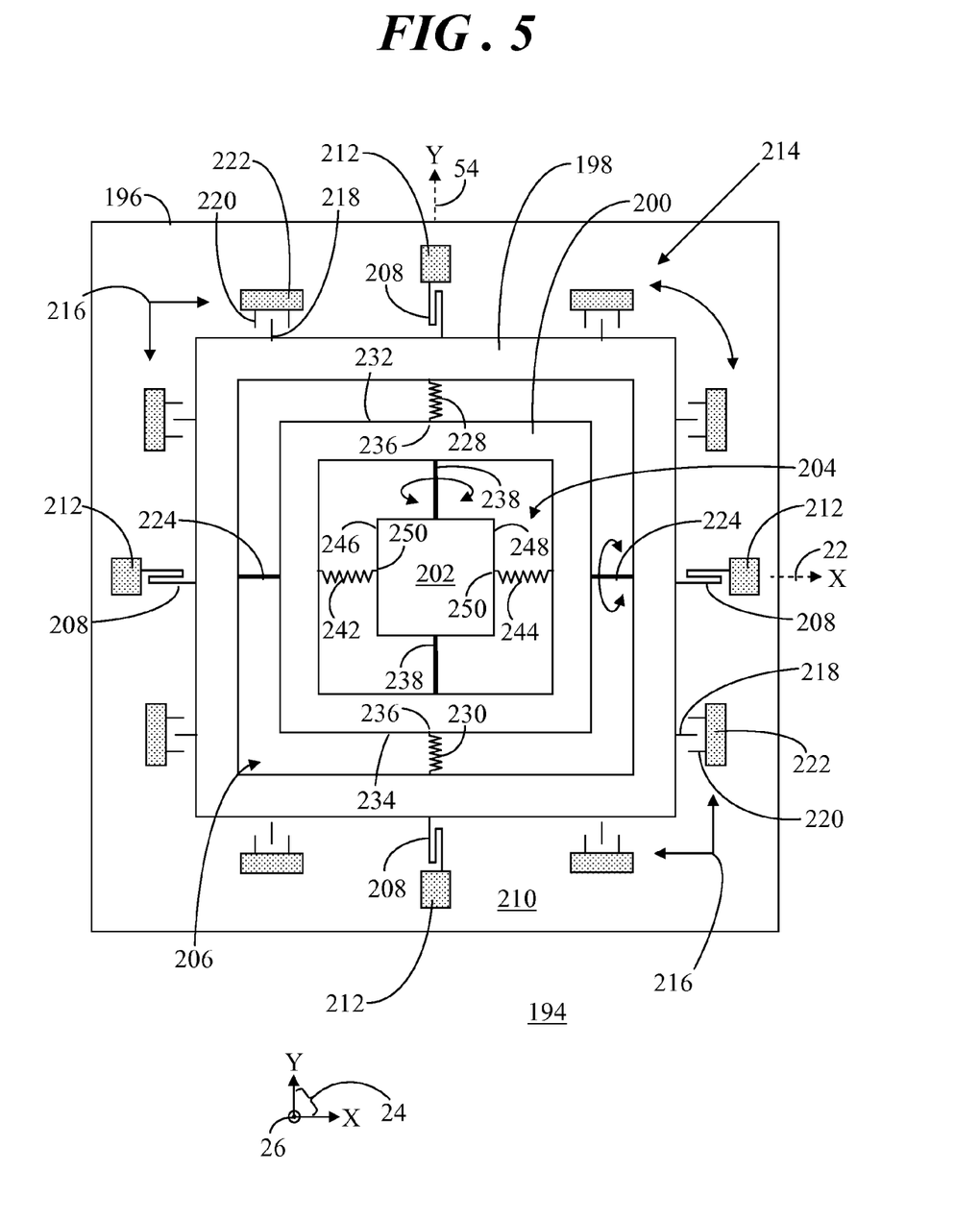
FIG. 5 shows a top view of a dual-axis gyro sensor in accordance with yet another alternative embodiment.

FIG. 5 shows a top view of a dual-axis gyro sensor 194 in accordance with yet another alternative embodiment. Dual-axis gyro sensor 132 (FIG. 4) implements a configuration that includes multiple drive mass structures that linearly oscillate in their respective directions parallel to the X- and Y-axes. In the alternative embodiment of dual-axis gyro sensor 194, a single drive mass is driven to oscillate in a rotary motion about Z-axis 26 in a plane substantially parallel to X-Y plane 24. Gyro sensor 194 has a generally planar structure within X-Y plane 24, and is generally configured to sense angular rate about both X-axis of rotation 22 and Y-axis of rotation 54.

Gyro sensor 194 includes a substrate 196, a drive mass 198, a sense mass 200, another sense mass 202, and various mechanical linkages which will be described in detail below. In the specific embodiment of FIG. 5, sense mass 202 resides in a central opening 204 extending through sense mass 200, and sense mass 200 resides in a central opening 206 extending through drive mass 198. As such, drive mass 198 and sense mass 200 are frame structures, and each of drive mass 198, sense mass 200, and sense mass 202 have a common center.

Folded springs 208 are connected to drive mass 198, each of which is in turn coupled to a surface 210 of substrate 196 via anchors 212. Thus, drive mass 198 is suspended above surface 210. A drive system 214 resides proximate drive mass 198. Drive system 214 includes sets of drive elements 216 in proximity to drive mass 198 to oscillate drive mass 198 in a rotary motion. Each set of drive elements 216 includes movable comb fingers 218 and fixed comb fingers 220. In an embodiment, movable comb fingers 218 are coupled to and extend from a perimeter of drive mass 198, and fixed comb fingers 220 are coupled to surface 210 of substrate 196 via anchors 222. Fixed comb fingers 220 are spaced apart from and positioned in alternating arrangement with movable comb fingers 218.

Drive mass 198 is configured to undergo rotary oscillatory motion about Z-axis 26 substantially parallel to X-Y plane 24. In general, an alternating current (AC) voltage may be applied to fixed comb fingers 220 via a drive circuit (not shown) to cause drive mass 198 to oscillate about Z-axis 26 due to the suitably applied voltage and the structure of folded springs 208.

Dual-axis gyro sensor 194 further includes on-axis torsion springs 224 coupled to sense mass 200 and co-located with X-axis of rotation 22, and an off-axis spring system. In the illustrated embodiment, the off-axis spring system includes off-axis springs 228 and 230. Off-axis spring 228 is disposed at an inner end 232 of sense mass 200 and off-axis spring 230 is disposed at an inner end 234 of sense mass 200, where inner ends 232 and 234 are symmetrically located on opposing sides of X-axis of rotation 22. In particular, each of off-axis springs 228 and 230 has a connection interface 236 that is directly physically coupled to sense mass 200 at locations that are displaced away from X-axis of rotation 22. On-axis torsion springs 224 and off-axis springs 228 and 230 enable sense mass 200 to oscillate out of X-Y plane 24, along Z-axis 26 as a function of the angular rate, i.e., the angular velocity, of gyro sensor 194 about X-axis of rotation 22.

Additionally, dual-axis gyro sensor 194 includes on-axis torsion springs 238 coupled to sense mass 202 and co-located with Y-axis of rotation 54, and an off-axis spring system. In the illustrated embodiment, the off-axis spring system includes off-axis springs 242 and 244. Off-axis spring 242 is disposed at an outer end 246 of sense mass 202 and off-axis spring 244 is disposed at an outer end 248 of sense mass 202, where outer ends 246 and 248 are symmetrically located on opposing sides of Y-axis of rotation 54. In particular, each of off-axis springs 242 and 244 has a connection interface 250 that is directly physically coupled to sense mass 202 at locations that are displaced away from Y-axis of rotation 54. On-axis torsion springs 238 and off-axis springs 242 and 244 enable sense mass 202 to oscillate out of X-Y plane 24, along Z-axis 26 as a function of the angular rate, i.e., the angular velocity, of gyro sensor 194 about Y-axis of rotation 54.

In the illustrated embodiment, each of on-axis torsion springs 224 and off-axis torsion springs 228 and 230 connect sense mass 200 to drive mass 198. In addition, each of on-axis torsion springs 238 and off-axis torsion springs 242 and 244 connect the inner sense mass 202 to sense mass 200. Accordingly, each of sense masses 200 and 202 is suspended above the underlying substrate 196. Electrodes (not shown) are formed on surface 210 of substrate 196 at suitable locations underlying sense masses 200 and 202 to sense the position change as each of sense masses 200 and 202 undergo oscillatory out-of-plane motion.

In operation, drive system 216 enables mechanical oscillation of drive mass 198 in a plane parallel to surface 210 of substrate 196 about Z-axis of rotation 26 perpendicular to surface 210. Both sense mass 200 and sense mass 202 oscillate about Z-axis of rotation 26 together with drive mass 198 due to the high stiffness of respective on-axis torsion springs 224 and 238 to this motion. Once sense masses 200 and 202 are put into oscillatory motion about Z-axis of rotation 26, sense mass 200 is capable of detecting angular velocity of gyro sensor 194 about Y-axis of rotation 54. In particular, the angular velocity of gyro sensor 194 about Y-axis of rotation 54 produces a Coriolis acceleration that causes sense mass 200 to oscillate about its sense axis, i.e., X-axis of rotation 22, at an amplitude that is proportional to the angular rotation rate of gyro sensor 194 about Y-axis of rotation 54. By a similar principle, sense mass 202 is capable of detecting angular velocity of gyro sensor 194 about X-axis of rotation 22. That is, as gyro sensor 194 experiences an angular velocity about X-axis of rotation 22, a Coriolis acceleration occurs about Y-axis of rotation 54. The Coriolis acceleration results in movement of sense mass 202 about its sense axis, i.e., Y-axis of rotation 54.

On-axis torsion springs 224 and off-axis springs 228 and 230 function cooperatively to achieve a closer match between the frequency of oscillation of drive mass 198 (i.e., the drive frequency) and the frequency of oscillation of sense mass 200 (i.e., the sense frequency). Likewise, on-axis torsion springs 238 and off-axis springs 242 and 244 function cooperatively to achieve a closer match between the frequency of oscillation of drive mass 198 (i.e., the drive frequency) and the frequency of oscillation of sense mass 202 (i.e., the sense frequency).

Gyro sensor 194 is provided with generally rectangular structures 198, 200, and 202 for the drive mass and sense mass(es). However, in alternative embodiments, the drive mass and/or sense mass(es) can have different shapes, such as circular rings, disks, and the like. In addition, the drive mass and sense mass(es) may be arranged differently from that which is shown. For example, one sense mass may be centrally located, another sense mass may form an outer frame structure, and the drive mass may be interposed between the two sense masses. In accordance with the embodiments described herein, such variances in structure will still include on-axis torsion springs and an off-axis spring system that function cooperatively to achieve a closer match between drive frequency and sense frequency. Additionally, although gyro sensors are described herein, it should be understood that the combination of on-axis torsion springs and an off-axis spring system may be readily implemented in an angular accelerometer design that measures the rate of change of the angular velocity.

In summary, embodiments of the invention entail microelectromechanical systems (MEMS) inertial sensor devices in the form of gyro sensors and angular accelerometers having one or more teeter-totter type sense masses. In particular, a gyro sensor is configured to sense angular rotation about an axis parallel to the substrate of the gyro sensor due to the influence of a Coriolis acceleration component. Various embodiments of a gyro sensor include both on-axis torsion springs and an off-axis spring system coupled to a teeter-totter sense mass. The on-axis torsion springs are placed along the axis of rotation and the off-axis spring system is coupled to the sense mass at one or more locations that are displaced from the axis of rotation. The off-axis spring system provides sufficient torsion stiffness in the axis of rotation to achieve improved matching between a drive frequency and a sense frequency of the gyro sensor. Improved matching between the drive frequency and sense frequency effectively increases energy transfer from the drive mass to the sense mass, thereby boosting signal output. Moreover, angular inertial sensor devices that include the off-axis spring system can be produced using existing fabrication technology that are less sensitive to fabrication process variations, and consequently provide less erroneous signal components.

Although the preferred embodiments of the invention have been illustrated and described in detail, it will be readily apparent to those skilled in the art that various modifications may be made therein without departing from the spirit of the invention or from the scope of the appended claims. That is, it should be appreciated that the exemplary embodiments are only examples, and are not intended to limit the scope, applicability, or configuration of the invention.

What is claimed is:

1. An inertial sensor comprising:
a substrate having a surface;
a drive mass configured to undergo oscillatory motion within a plane substantially parallel to said surface;
a sense mass linked to said drive mass, said sense mass including first and second ends, wherein an entirety of said first end is located on a first side of an axis of rotation, an entirety of said second end is located on a second side of said axis of rotation, and said first and second ends are symmetrically displaced away from said axis of rotation;
an on-axis torsion spring coupled to said sense mass, said on-axis torsion spring being co-located with an axis of rotation; and
an off-axis spring system having a connection interface that is coupled to said sense mass at a location on said sense mass that is displaced away from said axis of rotation, said off-axis spring system including a first off-axis spring disposed at said first end of said sense mass and a second off-axis spring disposed at said second end of said sense mass, each of said first and second off-axis springs including said connection interface, wherein said on-axis torsion spring and said off-axis spring system enable said sense mass to oscillate out of said plane.

2. An inertial sensor as claimed in claim 1 wherein said drive mass undergoes said oscillatory motion at a drive frequency, and said on-axis torsion spring and said off-axis spring system enable said sense mass to oscillate at a sense frequency that is substantially equivalent to said drive frequency.

3. An inertial sensor as claimed in claim 1 further comprising link spring components coupling said sense mass to said drive mass, wherein a first total spring constant of said on-axis torsion spring and said off-axis spring system is substantially equivalent to a second total spring constant of said link spring components.

4. An inertial sensor as claimed in claim 1 wherein said off-axis spring system restricts movement of said sense mass such that said sense mass rotates about said axis of rotation.

5. An inertial sensor as claimed in claim 1 wherein said sense mass has a central opening, and said drive mass resides in said central opening.

6. An inertial sensor as claimed in claim 1 wherein:
said sense mass includes a central opening delineated by an inner periphery of said sense mass, said inner periphery including said first and second ends;
said first off-axis spring resides in said central opening and has said connection interface disposed at said first end; and
said second off-axis spring resides in said central opening and has said connection interface disposed at said second end.

7. An inertial sensor as claimed in claim 1 wherein said on-axis torsion spring and said off-axis spring system connect said sense mass to said surface of said substrate.

8. An inertial sensor as claimed in claim 1 wherein said drive mass has a central opening, and said sense mass resides in said central opening.

9. An inertial sensor as claimed in claim 8 wherein:
said sense mass has a second central opening; and
said inertial sensor further comprises an anchor coupling said on-axis torsion spring to said surface of said substrate, said anchor being positioned in said second central opening.

10. An inertial sensor as claimed in claim 9 wherein said anchor is co-located with said axis of rotation.

11. An inertial sensor as claimed in claim 1 further comprising:
a second sense mass linked to said drive mass;
a second on-axis torsion spring coupled to said second sense mass, said second on-axis torsion spring being co-located with a second axis of rotation that is perpendicular to said axis of rotation; and
a second off-axis spring system having a second connection interface that is coupled to said second sense mass at a second location that is displaced away from said second axis of rotation, wherein said second on-axis torsion spring and said second off-axis spring system enable said second sense mass to oscillate out of said plane.

12. An inertial sensor as claimed in claim 1 wherein said drive mass comprises:
a first drive mass structure; and
a second drive mass structure, said first and second drive mass structures exhibiting reflectional symmetry relative to said axis of rotation.

13. An inertial sensor as claimed in claim 12 wherein:
said second drive mass structure is disposed in said plane laterally relative to said first drive mass structure; and
said inertial sensor further comprises a drive system configured to drive said first and second drive mass structures in opposite directions parallel to said plane.

14. An inertial sensor comprising:
a substrate having a surface;
a sense mass having first and second ends, and said sense mass including a central opening, said sense mass including first and second ends, wherein an entirety of said first end is located on a first side of an axis of rotation, an entirety of said second end is located on a second side of said axis of rotation, and said first and second ends are symmetrically displaced away from said axis of rotation;
- a drive mass linked to said sense mass and residing in said central opening, said drive mass being configured to undergo oscillatory motion within a plane substantially parallel to said surface;
- an on-axis torsion spring coupled to said sense mass, said on-axis torsion spring being co-located with said axis of rotation; and
- an off-axis spring system including a first off-axis spring disposed at said first end of said sense mass and a second off-axis spring disposed at said second end of said sense mass, each of said first and second off-axis springs including a connection interface coupled to said sense mass at a location on said sense mass that is displaced away from said axis of rotation, wherein said on-axis torsion spring and said off-axis spring system enable said sense mass to rotate out of said plane about said axis of rotation.

15. An inertial sensor as claimed in claim 14 wherein said drive mass undergoes said oscillatory motion at a drive frequency, and said inertial sensor further comprises link spring components coupling said sense mass to said drive mass, said on-axis torsion spring and said off-axis spring system having a first total spring constant that is substantially equivalent to a second total spring constant of said link spring components to enable said sense mass to oscillate about said axis of rotation at a sense frequency that is substantially equivalent to said drive frequency.

16. An inertial sensor as claimed in claim 14 wherein:
- said drive mass comprises a first drive mass structure and a second drive mass structure, said first and second drive mass structures exhibiting reflectional symmetry relative to said axis of rotation; and
- said inertial sensor further comprises a drive system configured to drive said first and second drive mass structures in opposite directions parallel to said plane.

17. An inertial sensor comprising:
- a substrate having a surface;
- a drive mass configured to undergo oscillatory motion within a plane substantially parallel to said surface at a drive frequency, said drive mass including a first drive mass structure and a second drive mass structure, said first and second drive mass structures exhibiting reflectional symmetry relative to an axis of rotation, and said first and second drive mass structures being driven in opposite directions parallel to said plane;
- a sense mass linked to said drive mass, said sense mass including first and second ends, wherein an entirety of said first end is located on a first side of an axis of rotation, an entirety of said second end is located on a second side of said axis of rotation, and said first and second ends are symmetrically displaced away from said axis of rotation;
- an on-axis torsion spring coupled to said sense mass, said on-axis torsion spring being co-located with said axis of rotation; and
- an off-axis spring system having a connection interface that is coupled to said sense mass at a location on said sense mass that is displaced away from said axis of rotation, said off-axis spring system including a first off-axis spring disposed at said first end of said sense mass and a second off-axis spring disposed at said second end of said sense mass, each of said first and second off-axis springs including said connection interface, wherein said on-axis torsion spring and said off-axis spring system enable said sense mass to oscillate out of said plane at a sense frequency that is substantially equivalent to said drive frequency.

18. An inertial sensor as claimed in claim 17 wherein said sense mass has a central opening, and said first and second drive mass structures reside in said central opening.

* * * * *